United States Patent

[11] 3,568,694

| [72] | Inventor | Clarence L. Johnson<br>Encino, Calif. |
|------|----------|---------------------------------------|
| [21] | Appl. No. | 727,523 |
| [22] | Filed | May 8, 1968 |
| [45] | Patented | Mar. 9, 1971 |
| [73] | Assignee | Lockheed Aircraft Corporation<br>Burbank, Calif. |

[54] JET ENGINE INSTALLATION FOR NOISE CONTROL
1 Claim, 6 Drawing Figs.

[52] U.S. Cl..................................................... 137/15.1,
181/33
[51] Int. Cl................................................. F02k 11/00
[50] Field of Search......................................... 137/15.1,
15.2; 60/35.66 (L); 230/(ID); 181/33.21

[56] References Cited
UNITED STATES PATENTS
| 2,869,670 | 1/1959 | Hoffman | 60/35.6UX |
| 3,347,496 | 10/1967 | Opfer | 137/15.1X |

*Primary Examiner*—Alan Cohan
*Attorney*—George C. Sullivan

ABSTRACT: A jet or fan-jet engine installation wherein inlet noise is reduced on takeoff and landing by changing the direction of the noise radiated from the inlet and by using an inlet duct having soundproofing. Exhaust noise is reduced by use of tertiary air bleed (or quaternary bleed) to reduce the shearing velocity of the final jet.

PATENTED MAR 9 1971

INVENTOR.
CLARENCE L. JOHNSON
BY George C. Sullivan
Agent

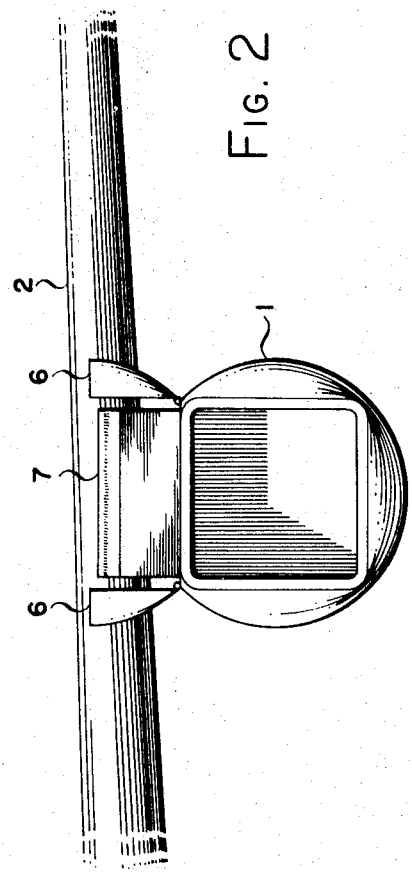
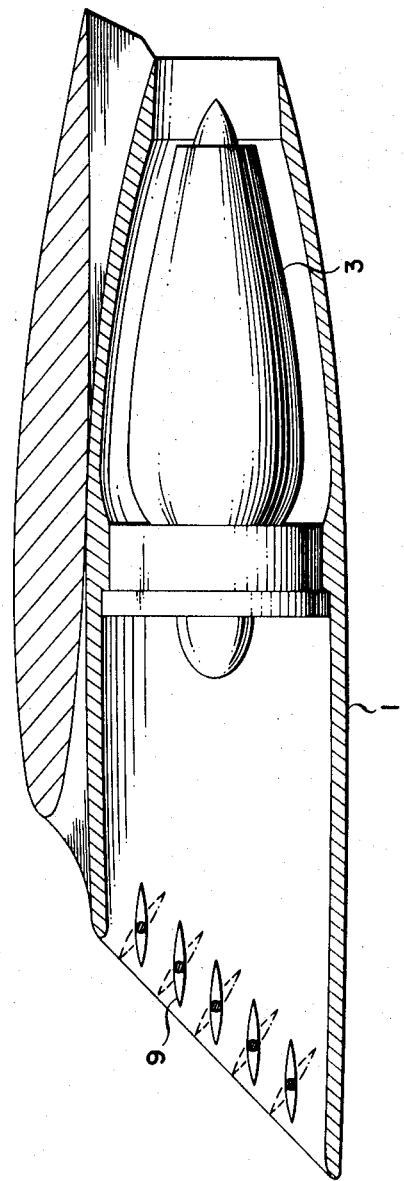

PATENTED MAR 9 1971 3,568,694

*INVENTOR.*
CLARENCE L. JOHNSON
BY
*George C. Sullivan*
Agent

JET ENGINE INSTALLATION FOR NOISE CONTROL

This invention relates to noise suppression and more particularly to a noise suppression system for jet engines.

The problems involved with noise suppression relative to aircraft have been known for some time. Noise control in aircraft is concerned with two areas: passenger comfort within the cabin and community comfort outside the aircraft. The present invention deals primarily with the latter area.

Jet engine noise is the main sound heard in the vicinity of the aircraft and is caused by the compressor and exhaust. The former is generated by the rotor and stator blades and is a high frequency noise. This noise is generally heard forward of the engine. However, on turbofan engines, a considerable whine is carried rearward by the secondary airflow and is heard behind the engines. While compressor noise increases with speed and is generally masked by the more rapidly increasing exhaust noise, it predominates at the lower engine power setting and thus presents a more difficult problem on takeoff and landing.

In the past, the high frequency compressor noise has been suppressed as much as possible by changing the number, shape, and relative spacing of the rotor and stator blades. However, it has been observed that if the number of compressor blades is increased so as to elevate the sound above the audible range, the efficiency is impaired, and serious production problems are presented. Thus, a compromise was reached between noise and performance. Also, some noise can be suppressed by the design of the intakes. Furthermore, landing and takeoff patterns have been studied, such that aircraft might traverse a less populated area.

The present invention provides increased noise suppression in a jet engine by utilizing an inlet arrangement which comprises a forwardly opening inlet, an upwardly opening inlet, and means for selectively opening one inlet while closing the other.

It is therefore a primary object of the invention to provide a jet engine having improved noise suppression.

A further object of the invention is to provide suppression of jet engine inlet noise.

These and other objects and advantages will become readily apparent from the following detailed description when taken with the drawings in which:

FIG. 2 is a front view of FIG. 1;

FIG. 4 is a side view, partly in cross section, of a third embodiment of the invention;

Noise is generally recognized as a class of sounds comprising a frequency spectrum of energy without clearly defined frequency components. Noise may be objectionable to the human ear and in such case steps must be taken to reduce the noise to acceptable levels. One difficulty is that sounds of different frequencies are not detected equally well by the human ear. Thus, frequencies between 1,000 and 4,000 cycles per second (Hertz) appear three times louder than those above or below this range; and sounds in the higher frequencies tend to be directional and radiate as beams from a source. Also, high frequency sounds attenuate or lose power in air much more quickly than sounds in the low frequencies.

Analyses of jet engine noise indicates that the frequency spectrum varies from the low frequency roar of the exhaust wake to the high frequencies from the compressor and from the turbulent mixing of the jet exhaust and air close to the exhaust nozzle. Also, on turbofan engines, an appreciable whine is carried rearwards by the secondary airflow and is heard behind the engine.

Figure 1:
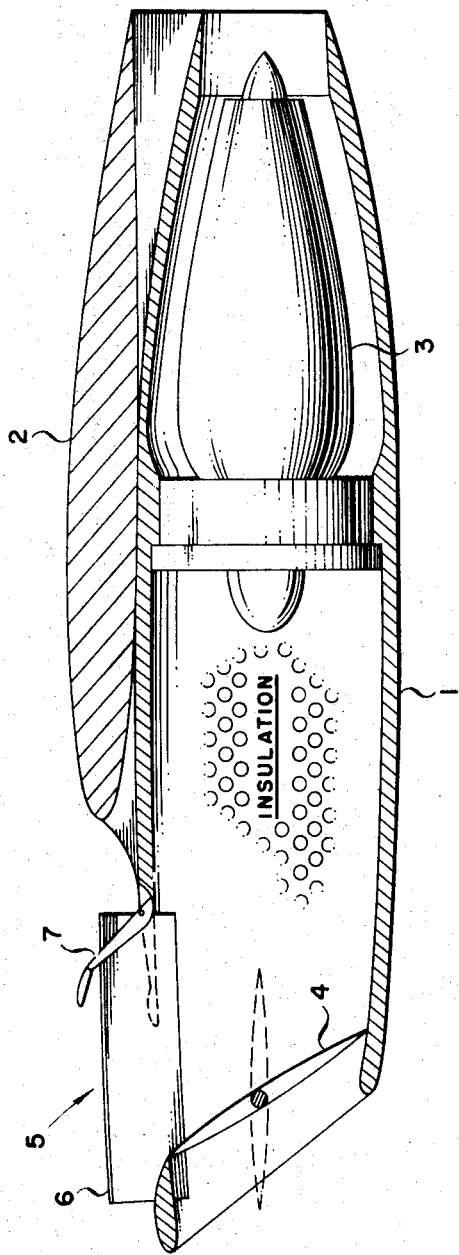
FIG. 1 is a side view, partly in cross section, of one embodiment of the invention.

Referring now to FIGS. 1 and 2, a nacelle 1 is shown as supported on the aircraft wing 2 by conventional means. A jet engine 3, which may be either a turbojet or turbofan, is mounted in the rear of the nacelle. A long inlet, preferably having the entire inner shell lined with sound proofing material as indicated by the legend, is located at the front of the nacelle. For example, duct length of about twenty feet has produced a reduction in noise of more than 15 db over a simple short bellmouth inlet.

Positioned in the main inlet is a vane 4 which is rotatable between the two positions indicated. An upwardly opening inlet 5 is formed in the top of the nacelle by a pair of doors 6, which as illustrated open upwardly and outwardly. A deflector 7 is pivoted at the rear of the inlet 5 and is movable from an inactive position to an open position when the doors 6 are actuated.

For takeoff and landing, the doors 6 and 7 are open, and the vane 4 is closed as indicated by the solid line positions. Engine air thus enters through inlet 5 instead of the front inlet. Since the high frequencies generated by the turbine are directional, this noise is radiated upwardly through inlet 5 and away from the airport area and adjacent community.

After takeoff, during cruise and prior to the landing approach, the doors 6 and 7 are closed and the vane 4 is open. In this mode, air enters the engine in the usual manner.

Figure 3:
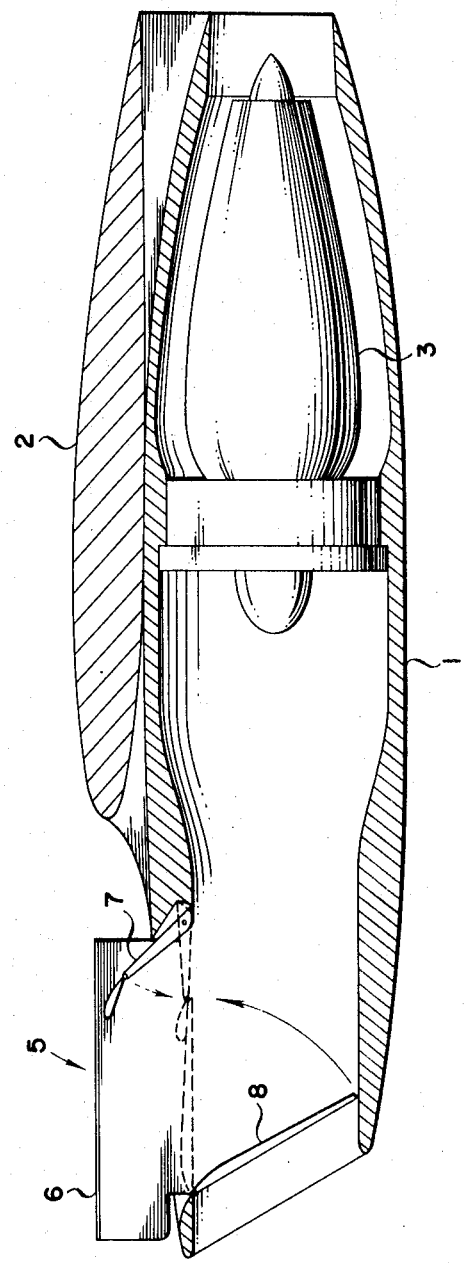
FIG. 3 is a side view, partly in cross section, of another embodiment of the invention.

With reference to FIG. 3, this embodiment is similar to that of FIG. 1, with the exception that the vane 4 is replaced with a door 8 which pivots about the upper edge. For takeoff and landing the door 8 is down, as in the solid line position, and closes off the front inlet while at the same time the doors 6 are open.

In the embodiment of FIG. 4, a plurality of vanes 9 are positioned in the inlet as indicated and are adapted to be rotated about transverse axes. Between takeoff and the landing approach, the vanes are rotated to the full line position, thereby presenting a minimum impedance to airflow. For takeoff and landing approach, the vanes are rotated to the broken line position which directs the high frequency noise upwards and away from the airport and local community.

Figure 5:
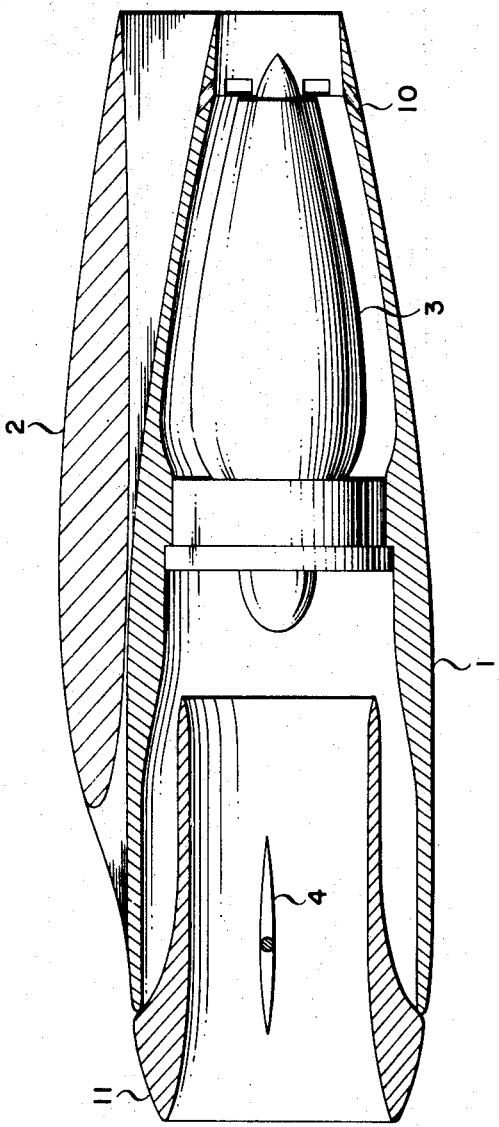
FIG. 5 is a side view, partly in cross section, of a fourth embodiment of the invention.
Figure 6:
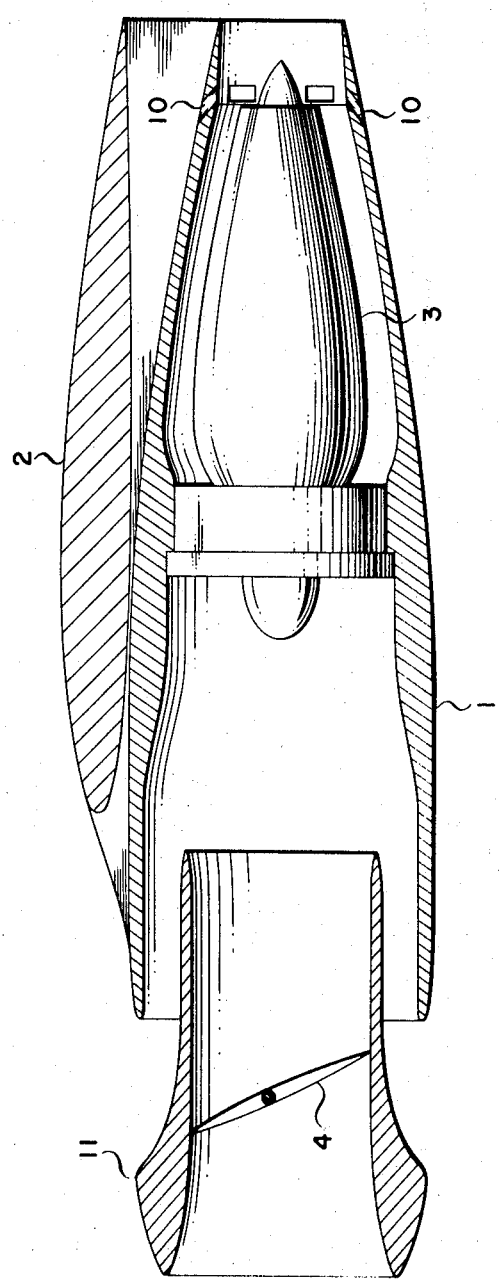
FIG. 6 is a second view of the FIG. 5 embodiment.

FIGS. 5 and 6 illustrate a further embodiment wherein an annular inner casing 11 is mounted in the inlet and is adapted to move between the position in FIG. 5 and a forward position in FIG. 6. A vane 4 is mounted within the casing and adapted to rotate about a transverse axis from the solid line or open position to the broken line or closed position.

For takeoff and landing the casing 11 is moved forward and the vane 4 is closed, thus opening an annular inlet between the casing and nacelle lip. The high frequency noise will be radiated outwardly through the annular opening in a modified conical pattern. Dispersion of the sound in a different direction and over a larger area substantially reduces the effects at the airport and on the surrounding community.

For the flight profile, other than takeoff and landing, the inner casing is retracted and the vane is rotated to the open position. The inlet now operates in the conventional manner.

Jet exhaust noise suppression may be added to provide overall noise reduction. As the jet exhaust noise is caused by the shearing action between the high velocity exhaust stream and the surrounding air, a modification of the shear face or a more gradual mixing of the exhaust with the atmosphere can reduce noise levels. Turbofan engines are quieter than turbojet engines of equivalent thrust as far as jet exhaust noise is concerned. The low velocity secondary airflow tends to broaden the jet exhaust shear area and reduce the noise at the source.

Exhaust noise may be further suppressed by injecting large quantities of ambient air into the jet exhaust. Referring to FIGS. 5 and 6, a plurality of intakes 10 are positioned around the nozzle to admit outside air to the exhaust. The interaction of these two flows modifies the jet exhaust noise at its source.

While specific embodiments of the invention have been shown and described, it should be understood that certain alterations, modifications and substitutions may be made to the instant disclosure without departing from the spirit and scope of the invention as defined by the appended claims.

I claim:
1. The combination comprising a nacelle, an engine mounted in said nacelle, an inlet on the forward end of the nacelle, an upwardly opening inlet, a deflector at the rear of the last mentioned inlet for deflecting air into the nacelle, and a vane positioned in the first mentioned inlet and rotatable about a horizontal axis in the center of the inlet and transverse to the longitudinal axis of the inlet, said vane when closed sloping down toward the rear of the inlet.